United States Patent [19]

Chang

[11] Patent Number: 5,695,229
[45] Date of Patent: Dec. 9, 1997

[54] INTERCHANGABLE SHOVEL/SCRAPER

[76] Inventor: William Chang, 20 Glen Echo Crt., Brampton, Ontario, Canada, L6S 5T9

[21] Appl. No.: 676,985

[22] Filed: Jul. 8, 1996

[51] Int. Cl.⁶ .................................................. A01B 1/20
[52] U.S. Cl. .................................................. 294/51; 294/59
[58] Field of Search .................... 294/49, 51, 54.5, 294/56, 59; 7/114–116; 15/105, 236.01, 236.05; 37/241, 265, 266, 285; 56/400.04, 400.11; 172/372–375

[56] References Cited

U.S. PATENT DOCUMENTS

| | | | |
|---|---|---|---|
| 348,794 | 9/1886 | Smith | 294/51 |
| 596,120 | 12/1897 | Oveson | 294/51 |
| 722,825 | 3/1903 | Ester | 294/59 |
| 1,204,332 | 11/1916 | Archer | 294/57 X |
| 1,307,328 | 6/1919 | Van Valkenburg | 294/51 |
| 1,319,306 | 10/1919 | Rogers | 294/51 |
| 1,442,671 | 1/1923 | Krehbiel | 294/51 |
| 3,334,939 | 8/1967 | Bonic | 294/51 |

*Primary Examiner*—Johnny D. Cherry

[57] ABSTRACT

An interchangable scraper and shovel having a handle carrying an improved scraper blade at one end thereof, a shovel blade having offset flanged strips on its lower surface for receiving the scraper blade and a mechanism carried on the shovel blade and the scraper blade for securing the shovel blade to the scraper blade.

2 Claims, 5 Drawing Sheets

INTERCHANGABLE SHOVEL/SCRAPER

BRIEF SUMMARY OF THE INVENTION

This invention relates to a interchangable scraper and shovel, and has for its object to provide an implement of this description that can be readily and conveniently changed from one to the other, as occasion may require.

This invention consists of a handle having permanently fixed to the lower end thereof an improved scraper blade. An improved shovel blade which has offset flanged strips and a latch on its under surface, in which the improved scraper blade is detachably receivable and when engaged, will securely hold the scraper to the shovel blade to enable the shovel to function as if it were permanently attached to the handle. The parts can be disassembled readily and virtually instantaneously either for the purpose of enabling the scraper to be used independently or for the purpose of facilitating storage of the parts in limit space.

BRIEF DESCRIPTION OF THE DRAWINGS

In drawings which illustrate an embodiment of the invention.

DETAIL DESCRIPTION OF THE DRAWINGS

Figure 1:
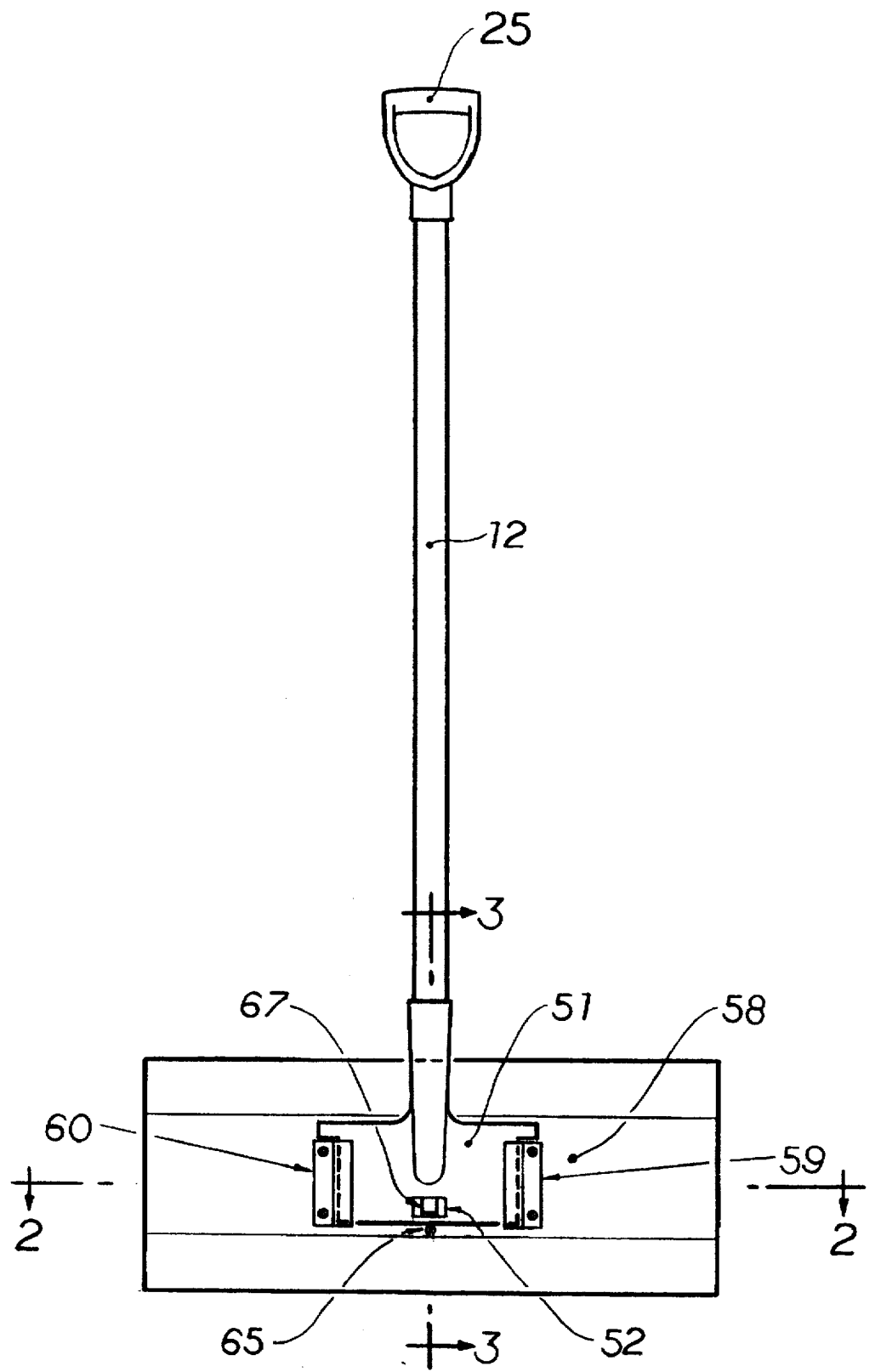
FIG. 1 is a rear elevation of the complete tool as assembled for use as a shovel.
Figure 2:
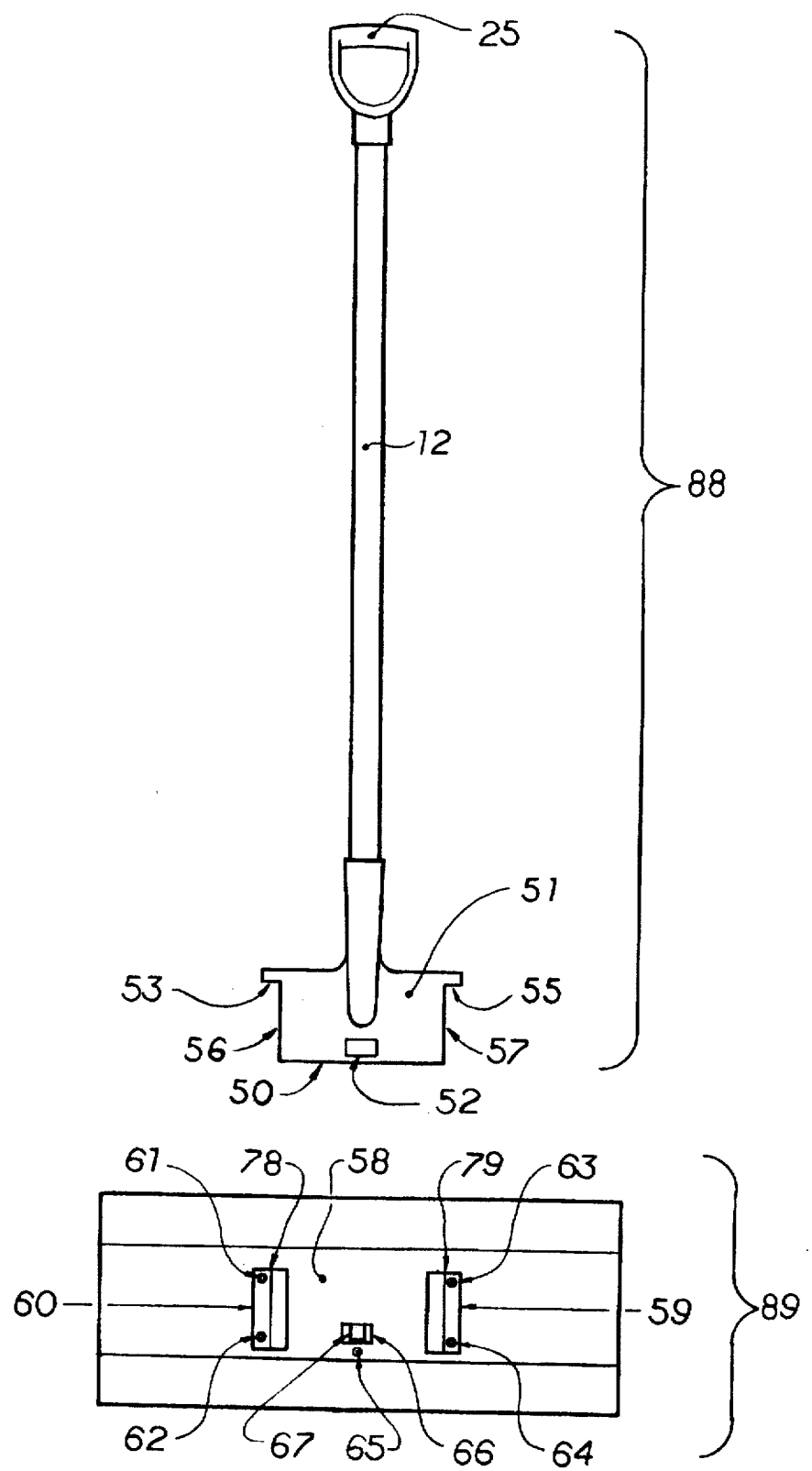
FIG. 2 is a rear elevation of the scraper and the shovel blade in detached mode.
Figure 3:
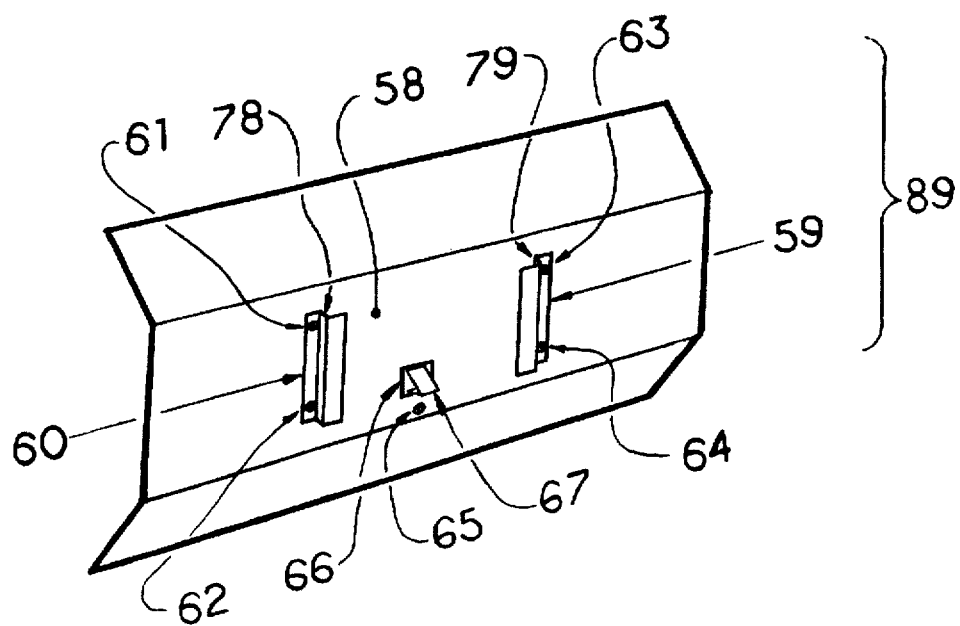
FIG. 3 is a rear perspective view of the shovel blade.
Figure 4:
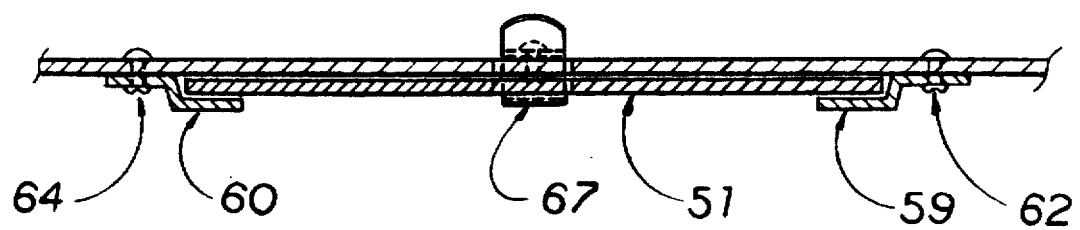
FIG. 4 is a view taken in section on the line 2—2 of FIG. 1.
Figures 5, 6:
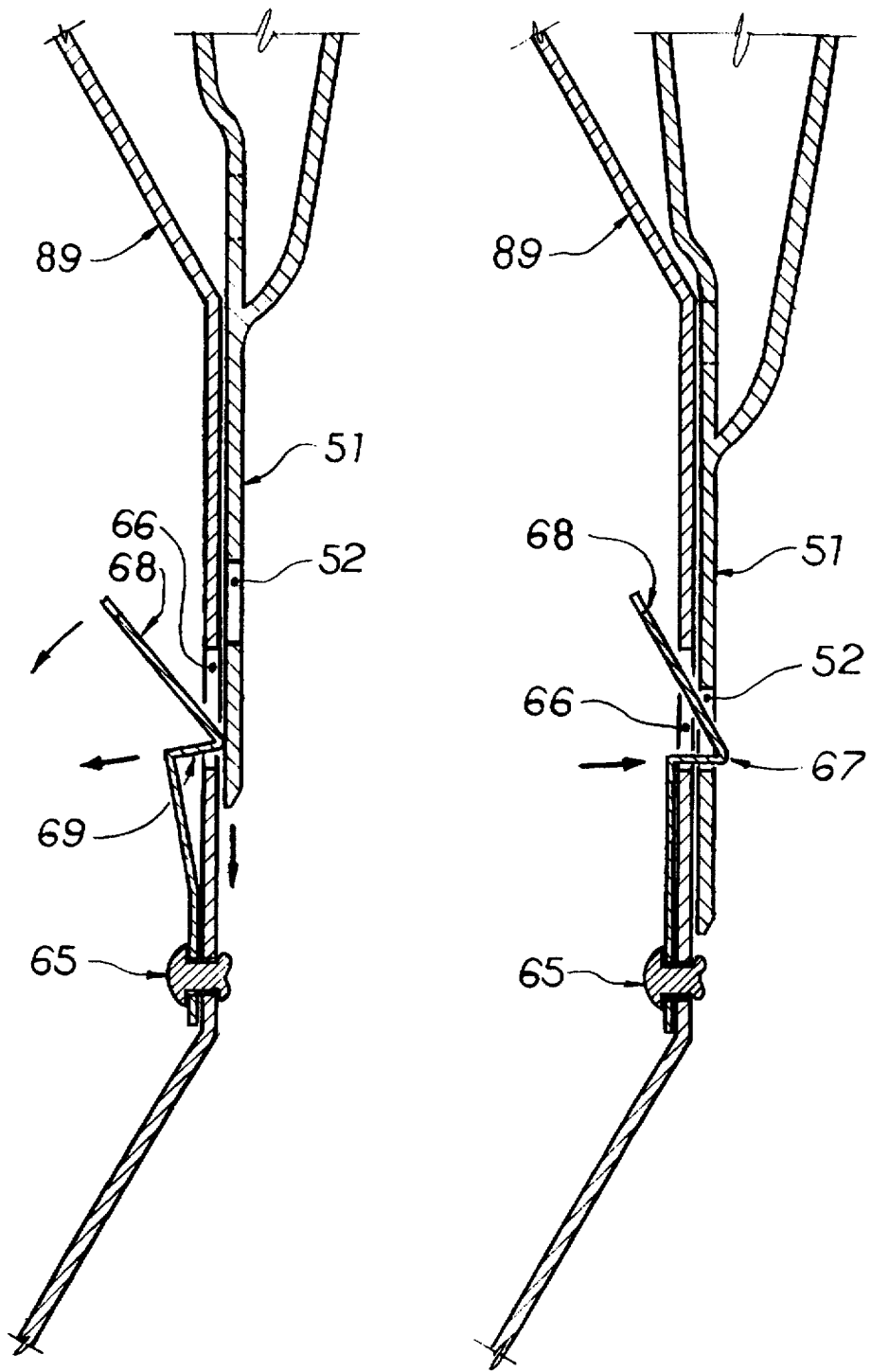
FIG. 5 is a view taken in section to demonstrate the latch being pushed forward by the scraper blade. The offset flanged strip is omitted in this view for clarity.
FIG. 6 is a view taken in section on the line 3—3 of FIG. 1. offset flanged strip is omitted in this view for clarity.
Figure 7:
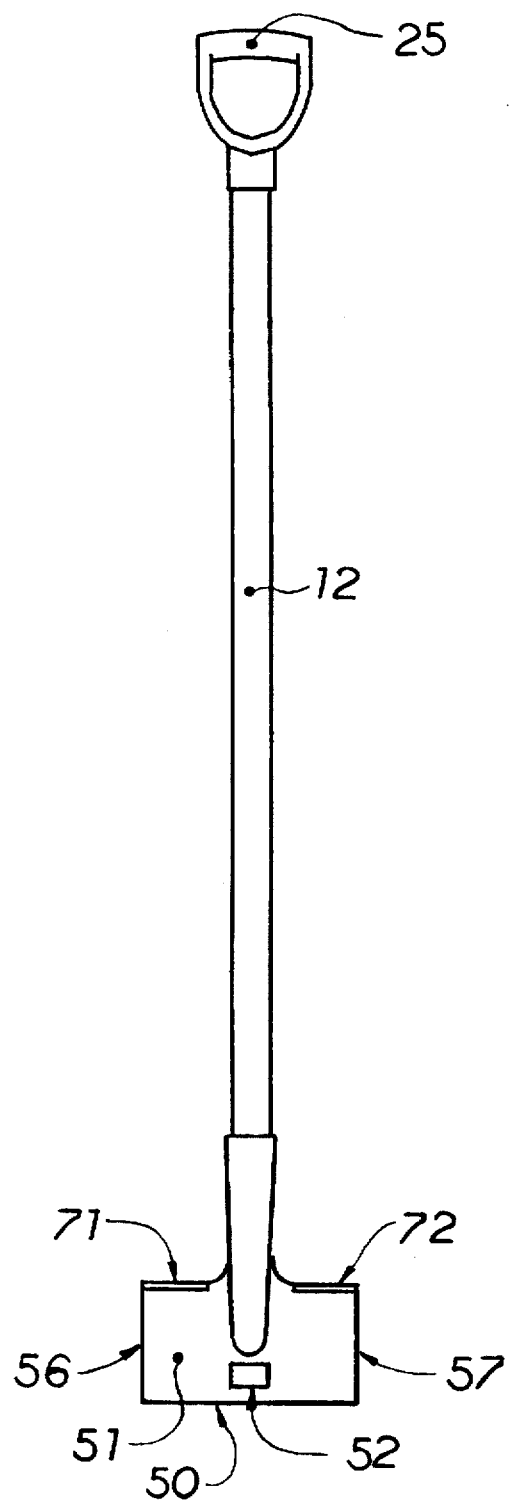
FIG. 7 is a rear elevation of a scraper to show different limit means.
Figure 8:
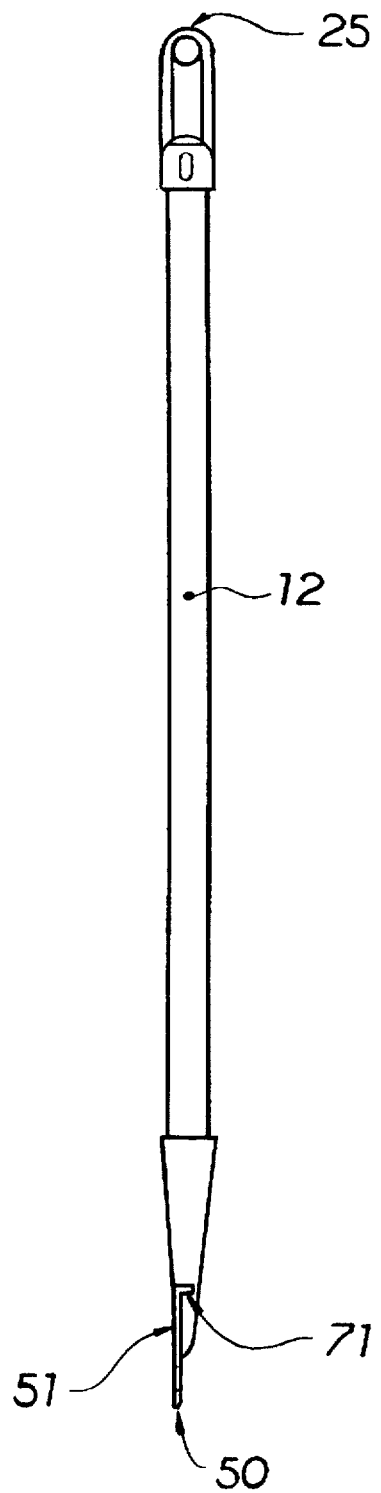
FIG. 8 is a side elevation of the scraper shown in FIG. 7.

Referring now more specifically to the drawings and in connection with which like reference numerals will refer to the same parts in the several views. The numeral 88 designates a scraper having an improved scraper blade 51 which has a scraping edge 50 at one end and a hole 52 in the central area and ears 53, 55 or other limiting means 71, 72 at the two corners of the other end and a handle 12 also connected to its other end and extending from the blade substantially in the plane of the blade, as shown in FIGS. 2 and 7. An improved shovel blade 89 is adapted to be detachably secured to the said scraper 88, which can be built to any desired shape or size, but in the practice of the invention, it is contemplated that a flat area is provided in the central portion of the shovel blade under surface 58 for the engagement with the said scraper blade 51, as shown in FIGS. 3 and 4. The said shovel blade 89 has a pair of offset flanged strips or channeled ways 59, 60 that are fastened at the flat area of the under surface 58 by rivets 61–64 to provide a space to receive with close fit the sides 56, 57 of the scraper blade 51 whereby to hold the scraper blade against lateral movement, as shown in FIG. 4. The scraper blade 51 when so engaged is substantially in face contact with the under surface of the shovel blade. A latch 67, which is punched and formed as a leaf spring, has a beveled surface 68 at one end and a horizontal surface 69 in the middle, and is secured to the front surface of the shovel blade by a rivet 65, as shown in FIGS. 5 and 6. A hole 66 in the shovel blade allows the latch 67 to protrude out of the under surface of the shovel blade 58, as shown in FIG. 3. The beveled surface end 68 of the latch 67 is the free end and preferred to be extended out of the front surface of the shovel blade to allow the operator to grip the free end when he wishes to unfasten the latch to disengage the scraper 88 from the shovel blade 89, as shown in FIGS. 5 and 6. When the scraper blade 51 is being introduced into the space provided by the offset flanged strips 59 and 60, the scraping edge 50 of the scraper blade 51 pushes the beveled surface 68 of the latch 67 and forces the free end of the latch to move toward the front surface of the shovel blade, as shown in FIG. 5. While the scraper blade 51 is inserted wholly within the space provided by the two offset flanged strips 59 and 60, the two ears of the scraper blade 53 and 55 have contacted the upper end of the offset flanged strips 78 and 79 and hence the scraper 88 is held from forward movement, as shown in FIGS. 1 and 2. Meanwhile, the hole in the scraper blade 52 has reached the pushed away latch 67 on the under surface of the shovel blade and the latch has moved back to its original resting position; hence, the scraper 88 is also held from rearward movement with respect to the shovel blade 89, as shown in FIG. 6. The shovel blade hence is securely attached to the scraper and can be operated as an ordinary shovel.

It is obviously apparent that many minor changes in the details of construction and arrangement of the several parts might be made and substituted for those shown and described without in the least departing from the nature of spirit of the invention.

What is claimed is:

1. An interchangable scraper and shovel comprising the combination with a scraper blade having a scraping edge at one end and a hole in the central area and ears or other limiting means at the two corners of the other end and a handle is also connected to its other end and extending from the blade substantially in the plane of the blade, a shovel blade, offset flanged strips or channeled ways are fastened on the under surface of the shovel blade to provide a space to receive the said scraper blade and in which the scraper blade is detachably engaged and the sides of the scraper blade are closely fitted, whereby to hold the scraper blade against lateral movement, the scraper blade when so engaged being substantially in face contact with the under surface of the shovel blade, and means to limit the said scraper blade's forward movement with respect to the said shovel blade in the direction longitudinally of the handle while the scraper blade is wholly within the said space, said means is the engagement of the said ears or other limiting means on the scraper blade with the upper end of the said offset flanged strips or the channeled ways on the under surface of the shovel blade, and means connecting the shovel blade with the handle and for holding the scraper blade and handle from movement in a direction to disengage the scraper blade from said connecting means, said last means comprising a latch fastened on the front surface of the said shovel blade and a hole at approximately the center of the two said offset flanged strips or channeled ways to allow the said latch to protrude out of the under surface of the said shovel blade to engage with the said hole in the central area of the said scraper blade while the said scraper blade is wholly within the said space.

2. An interchangable scraper and shovel according to claim 1 in which the said shovel blade has a flat area in the central portion of the shovel blade under surface.

* * * * *